United States Patent [19]

Fujioka

[11] Patent Number: 5,667,569

[45] Date of Patent: Sep. 16, 1997

[54] WATER-BASED INK AND INK JET RECORDING METHOD USING SAME

[75] Inventor: Masaya Fujioka, Nagoya, Japan

[73] Assignee: Brother Kogyo Kabushiki Kaisha, Nagoya, Japan

[21] Appl. No.: 635,598

[22] Filed: Apr. 22, 1996

[30] Foreign Application Priority Data

Jun. 29, 1995 [JP] Japan ................................. 7-163609

[51] Int. Cl.$^6$ ................................................ C09D 11/02
[52] U.S. Cl. ........................ 106/31.58; 106/31.86; 347/100
[58] Field of Search ........................ 106/20 R, 22 R, 106/20 D

[56] References Cited

U.S. PATENT DOCUMENTS

| | | | |
|---|---|---|---|
| 5,067,980 | 11/1991 | Koike et al. | 106/22 E |
| 5,092,926 | 3/1992 | Owatari | 106/22 H |
| 5,118,351 | 6/1992 | Shirota et al. | 106/20 R |
| 5,135,570 | 8/1992 | Eida et al. | 106/22 K |
| 5,156,675 | 10/1992 | Breton et al. | 106/20 D |
| 5,376,169 | 12/1994 | Hotomi et al. | 106/20 C |
| 5,397,388 | 3/1995 | Fujioka | 106/28 A |

FOREIGN PATENT DOCUMENTS

| | | |
|---|---|---|
| 62-21033 | 5/1987 | Japan . |
| 62-101672 | 5/1987 | Japan . |

OTHER PUBLICATIONS

English Abstracts of Japanese Patent Nos. 62-21033 and 62-101672, May 1987.

*Primary Examiner*—Helene Klemanski
*Attorney, Agent, or Firm*—Oliff & Berridge

[57] ABSTRACT

A water-based ink includes coloring agents, polyvalent alcohol, polyvalent alcohol monoalkyl ether, and water. The polyvalent alcohol monoalkyl ether preferably has a vapor pressure not greater than 0.1 mm Hg at 20° C. The ink exhibits superior recording properties (signal responsiveness, stability in liquid form, discharge stability, continuous recording ability over long periods of time, and ink discharge stability after use has been suspended for long periods of time), fluid stability, preservation stability, adherence to recording materials, quick drying, printing quality and low odor, thus being an excellent ink for various types of ink jet recording.

18 Claims, No Drawings

WATER-BASED INK AND INK JET RECORDING METHOD USING SAME

BACKGROUND OF THE INVENTION

1. Field of the Invention

The present invention relates to a water-based ink.

2. Description of Related Art

Ink jet recording methods that are known include static electricity aspiration methods, methods in which mechanical vibrations or displacements are imparted to ink using a piezoelectric device, and ink discharging methods such as methods wherein ink bubbles are caused to form by heating the ink and the pressure from that is used. Ink droplets are formed through these discharge methods, and recording is conducted by causing some or all of these droplets to adhere to the targeted recording materials such as paper or the like. In addition, when writing instruments such as fountain pens, felt-tip pens or ballpoint pens are used, ink is dispensed from the capillary tubes in the commonly known manner, and recording is conducted by causing this to be received by the targeted recording material. As ink used in these kinds of ink jet recording methods or writing instruments, ink formed by dissolving or dispersing various types of water-soluble dyes or pigments in water or a solution composed of water and water-soluble organic solvents has been used.

In the above-described types of conventional ink, naturally various properties are required. But of these, the properties which are particularly necessary are: a recording property such that when conducting recording using the ink, blinding and deposits are not formed at the nozzle, orifice or pen tip of the recording device so that stable dispensing is possible when recording is interrupted or when recording is not conducted for an extended period of time; a fluid stability property; a quick drying property such that printed materials dry quickly and do not smear even when touched by a finger or the like; a printing quality property such that there is no whisker-shaped smearing of printed characters or ruled lines or the like and there is no mixing of colors (bleeding) in areas where differing colors are beside each other; and a low odor property such that there is little odor from the ink itself.

Experiments have been performed in an effort to derive an ink having desired properties. For example, in Japanese Laid-Open Patent Publication Sho 62-21033, an ink is disclosed which contains as the primary components polyvalent alcohol derivatives selected from (mono-, di-, tri-) ethylene glycol alkyl ethers and/or (mono-, di-, tri-) ethylene glycol alkyl ether acetates, and alcohol amine, water-soluble dyes and water. However, conventional inks including the above-described example did not satisfy all of the fluid stability, quick drying, printing quality, safety and low odor properties.

SUMMARY OF THE INVENTION

In consideration of the above-described desired properties, it is an objective of the present invention to provide an ink and ink jet recording method which simultaneously satisfy the fluid stability, quick drying, printing quality and low odor properties.

In order to achieve the above and other objectives, the water-based ink of the present invention is a water-based ink containing water-soluble dyes or pigments as coloring agents; 5–15% by weight polyvalent alcohol monoalkyl ether, preferably having a vapor pressure at 20° C. not greater than 0.1 mm Hg, or more preferably, less than 0.01 mm Hg; and 5–50% by weight polyvalent alcohol; wherein the polyvalent alcohol monoalkyl ether contained in the water-based ink is preferably selected from triethylene glycol monoalkyl ether and tripropylene glycol monoalkyl ether.

Furthermore, in order to achieve the above and other objectives, the present invention is an ink jet recording method using as the recording fluid water-based ink containing water-soluble dyes or pigments as coloring agents; wherein the water-based ink, containing 5–15% by weight polyvalent alcohol monoalkyl ether preferably having a vapor pressure at 20° C. not greater than 0.1 mm Hg, or more preferably, less than 0.01 mm Hg, and 5–50% by weight polyvalent alcohol, is sprayed to perform recording on the targeted recording materials. Furthermore, in this ink jet recording method, the polyvalent alcohol monoalkyl ether contained in the water-based ink is preferably selected from triethylene glycol monoalkyl ether and tripropylene glycol monoalkyl ether.

DETAILED DESCRIPTION OF PREFERRED EMBODIMENTS

Water-soluble dyes represented by direct dyes, acidic dyes, basic dyes, reactive dyes and the like are used as the dye which is a component of the ink used in the present invention. In particular, ink which is optimum as ink for an ink jet recording method and which satisfies clarity, water solubility, stability, light fastness and other properties required include, for example: C.I. direct black 17, 19, 32, 51, 71, 108, 146, 154, 168; C.I. direct blue 6, 22, 25, 71, 86, 90, 106, 199; C.I. direct red 1, 4, 17, 28, 83, 227; C.I. direct yellow 12, 24, 26, 86, 98, 132, 142; C.I. direct orange 34, 39, 44, 46, 60; C.I. direct violet 47, 48; C.I. direct brown 109; C.I. direct green 59; C.I. acid black 2, 7, 24, 26, 31, 52, 63, 112, 118; C.I. acid blue 9, 22, 40 59, 93, 102, 104, 113, 117, 120, 167, 229, 234; C.I. acid red 1, 6, 32, 37, 51, 52, 80, 85, 87, 92, 94, 115, 181, 256, 289, 315, 317; C.I. acid yellow 11, 17, 23, 25, 29, 42, 61, 71; C.I. direct orange 7, 19; C.I. acid violet 49; C.I. basic black 2; C.I. basic blue 1, 3, 5, 7, 9, 24, 25, 26, 28, 29; C.I. basic red 1, 2, 9, 12, 13, 14, 37; C.I. basic violet 7, 14, 27; and C.I. food black 1, 2.

The above-described dye examples are those which are particularly suitable for the ink of the present invention, but the present invention is in no way limited to these dyes.

In addition, as pigments it is possible to use carbon black as well as many inorganic pigments and organic pigments. Examples of pigments which can be used include: azo pigments such as azo lake, insoluble azo pigment, condensed azo pigment, chelate azo pigment and the like; polycyclic pigments such as phthalocyanine pigment, perylene and perynone pigments, anthraquinone pigments, quinacridone pigments, dioxazine pigments, thioindigo pigments, iso-indolinone pigments, and quinophthalone pigments; organic pigments such as dye lakes including basic dye lake and acid dye lake and the like, and nitro pigment, nitroso pigment, aniline black daylight fluorescent pigment and the like; and inorganic pigments such as titanium oxide, ferric oxides, carbon black and the like. In addition, other pigments may also be used as long as these can be dispersed in the liquid phase. Furthermore, it is also possible to use as the above-described pigments, for example carbon black or the like, pigments which have been surface treated with surfactants or polymer dispersants.

The above-described pigment examples are those which are particularly suitable for the ink of the present invention, but the present invention is in no way limited to these pigments.

When the above-described pigments are used as coloring agents for the present invention, these can be dispersed through conventionally known methods along with suitable dispersants, solvents, pure water and other additives as necessary.

As dispersants, it is possible to use the polymer dispersants and surfactants which are used in pigment dispersion as noted in Japanese Laid-Open Patent Publication Sho 62-101672, for example; and as high polymer dispersants, it is possible to use natural polymer dispersants such as proteins like gelatin or albumin, natural rubbers such as Arabia rubber or traganth rubber, glucosides such as such as saponin, cellulose derivatives such as methyl cellulose, carboxy cellulose and hydroxy cellulose, and lignin sulfonic acid salts and shellac, and anion polymer dispersants such as polyacrylic acid salt, salts of styrene acrylic acid copolymer, salts of vinyl naphthalene acrylic acid copolymers, salts of styrene maleic acid copolymers, salts of vinyl naphthalene maleic acid copolymers, sodium salts of β-naphthalenesulfonates and formaldehyde polycondensation products, phosphoric acid salts, and non-ionized polymer dispersants such as polyvinyl alcohol, polyvinyl pyrrolidone and polyethylene glycol; and as surfactants, it is possible to use anion surfactants such as high grade alcohol sulfuric acid ester salts, liquid fatty oil sulfuric acid ester salts and alkyl allyl sulfonic acid salts, and non-ionized surfactants such as polyoxy ethylene alkyl ethers, polyoxy ethylene alkyl esters, sorbitan alkyl esters, and polyoxy ethylene sorbitan alkyl esters, and one or two types or more of these may be selected and used as suitable. The amount of usage is preferably 1–20% by weight of the entire weight of the ink in general.

On the other hand, the dispersing equipment used in dispersing the above-described pigments may be any general dispersant equipment. Bore mills, roll mills and sand mills can be cited as examples. Of these, sand mills, which are particularly fast, are preferable.

The above-described dyes and pigments may be used alone, or dyes may be used together or pigments may be used together, or it is also possible to mix together two or more dyes and pigments.

In addition, the above-described dyes and pigments are in general used in a ratio of, for example, 0.1–20% by weight for the ink of the present invention, and preferably, in the range of 0.3–15% by weight.

The polyvalent alcohol used in the present invention and in the ink used in the present invention is preferably one which achieves enhanced fluid stability of the ink through having an ink drying prevention (wetting) effect.

For example, this alcohol may be, for example: polyalkylene glycols such as polyethylene glycol and polypropylene glycol; or alkylene glycols such as ethylene glycol, propylene glycol, butylene glycol, diethylene glycol, dipropylene glycol, triethylene glycol, tripropylene glycol, 1,2,6-hexanetriol, thio diglycol, 1,3-butanediol, 1,5-pentanediol or hexylene glycol; or glycerin.

The above-described polyvalent alcohol content in the ink is preferably, for example, 5–50% by weight of the entire weight of the ink, more preferably 7–40% by weight, or most preferably 10–30% by weight. If the content is less than 5% by weight, the wetting action may be insufficient, possibly causing the problem of blinding to arise. In addition, if the content exceeds 50% by weight, the ink may be more viscous than necessary, possibly causing inability to be discharged and creating the problem that drying on the recording paper becomes extremely slow.

For the polyvalent alcohol monoalkyl ether used in the present invention and in the ink used in the present invention, and preferably having a vapor pressure of 0.1 mm Hg at 20° C., it is preferable to use one which improves the quick drying property of the ink on paper by effectively boosting the speed of ink saturation into the recording paper and in which feathering is difficult to create.

Specific examples of the above-described polyvalent alcohol monoalkyl ether include: diethylene glycol monomethyl ether (vapor pressure 0.1 mm Hg at 20° C.), diethylene glycol monobutyl ether (vapor pressure 0.01 mm Hg at 20° C.), diethylene glycol monoisobutyl ether (vapor pressure 0.01 mm Hg at 20° C.), dipropylene glycol monomethyl ether (vapor pressure 0.06 mm Hg at 20° C.), dipropylene glycol monopropyl ether (vapor pressure 0.02 mm Hg at 20° C.), dipropylene glycol monoisopropyl ether (vapor pressure 0.05 mm Hg at 20° C.), dipropylene glycol monobutyl ether (vapor pressure 0.05 mm Hg at 20° C.), triethylene glycol monomethyl ether (vapor pressure less than 0.01 mm Hg at 20° C.), triethylene glycol monobutyl ether (vapor pressure less than 0.01 mm Hg at 20° C.), tripropylene glycol monomethyl ether (vapor pressure 0.02 mm Hg at 20° C.), and tripropylene glycol monobutyl ether (vapor pressure less than 0.01 mm Hg at 20° C.).

General polyvalent alcohol alkyl ethers have a unique odor, and when those having a vapor pressure higher than 0.1 mm Hg at 20° C. are used, the ink itself may also become very odorous, and this becomes a problem when the ink is used in general offices and households. However, the polyvalent alcohol monoalkyl ethers listed as examples above have a vapor pressure of not greater than 0.1 mm Hg at 20° C., and hence they produce little odor even when used in the ink, so that the above-described problem does not arise.

Furthermore, among the above-described polyvalent alcohol alkyl ethers, those with a vapor pressure of less than 0.01 mm Hg at 20° C. have particularly little odor, and can be used with good results.

The polyvalent alcohol alkyl ether content in the ink is preferably, for example, 5–15% by weight of the entire weight of the ink, more preferably 7–12% by weight. If the content is less than 5% by weight, the saturation speed of the ink into the recording paper may be slow, possibly creating problems with respect to drying time and bleeding. In addition, if the content exceeds 15% by weight, the saturation into the recording paper may become extreme, possibly creating the problem that the ink reaches as far as the back of the paper, and also causing problems with respect to bleeding.

In addition, the water used in the present invention is preferably not general water, but preferably water having a high degree of purity such as ion exchanged water or distilled water.

The water content may be a wide range depending on the types of the above-described polyvalent alcohols and polyvalent alcohol monoalkyl ethers, the combinations of these and the properties desired in the ink, but in general is in the range of 10–90% by weight on the entire weight of the ink, or preferably 10–75% by weight, or more preferably 20–70% by weight.

The fundamental composition of the ink of the present invention or used in the present invention is as described above, but it is also possible to add as necessary other commonly known dispersants, surfactants, viscosity adjusting agents, surface tension adjusting agents, pH adjusting agents and anti-corrosion and anti-mold agents.

In addition, when ink used in ink jet recording methods of the type wherein the recording ink is electrically charged is prepared, specific resistance adjusting agents are added, such as inorganic salts including lithium chloride, ammonium chloride, sodium chloride or the like.

When the ink is applied to an ink jet method of the type wherein the ink is discharged by the action of thermal energy, the values of the thermal characteristics (for example, the specific heat, the coefficient of thermal expansion and the thermal electrical conductivity) are sometimes adjusted in a known manner.

The ink used in the present invention which is obtained as described above adequately resolves the problems of the related art, and is an ink for ink jet methods which has superior balance among all of the following: the recording properties (signal responsiveness, stability in liquid form, discharge stability, continuous recording ability over long periods of time, and ink discharge stability after use has been suspended for long periods of time), fluid stability, preservation stability, adherence to recording materials, quick drying, the printing quality property and the low odor property. This ink can be used as an ink for various types of ink jet recording, and provides superior recording.

The invention will be further described by way of the following examples.

The percentages listed hereafter are percentages by weight.

EXAMPLE 1

Liquid composition:

| | |
|---|---|
| acid yellow 23 | 1% |
| (acid yellow XX-SF made by Hoechst) | |
| polyethylene glycol | 10% |
| (weight average molecular weight 200) | |
| triethylene glycol monomethyl ether | 6% |
| pure water | 83% |

The above ingredients are sufficiently mixed, and an ink is made by filtering this mixture through a 0.8 μm membrane filter.

Using this ink, the tests of T1 through T6 below are performed through a recording apparatus having an on-demand type multi-head (discharge orifice diameter 35 μm, resistance of heating resistor 150 ohms, driving voltage 30 volts, and frequency 2 kHz) which performs recording by imparting thermal energy to the ink in the recording head, causing liquid bubbles to form, and a recording apparatus having an on-demand type of multi-head (discharge orifice diameter 40 μm, driving voltage 30 volts and frequency 10 kHz) which performs recording by imparting pressure to the ink in the recording head through piezo device vibrations. In all cases, favorable results and obtained. In addition, the test of T7 below is performed on ink which is adjusted, and in all cases, favorable results are obtained.

(T1) Storage stability: The ink is sealed in plastic film bags, and is stored at −30° C. and 60° C. for six months, and even after this, no precipitates of insoluble matter could be detected, and there is no change in the coloration or properties of the liquid.

(T2) Discharge stability: Continuous discharge is performed for 24 hours at room temperature, 5° C. and 40° C., but under all of these conditions, stable, high quality recording is performed from start to finish.

(T3) Discharge responsiveness: Discharging at two second intervals and discharging after two months of standing are conducted, but in both of these cases, no blinding is seen around the orifice tip and stable, uniform recording is performed.

(T4) Quality of recorded image: The images recorded on the target recording materials shown below are clear with high density.

Target recording materials:

"Xerox 4024" high quality paper manufactured by Xerox

"Seven Start" high quality paper manufactured by Hokuetsu Paper Mills Ltd.

"Shirobotan" manufactured by Honshu Paper Co.

"Toyo Roshi No. 4" non-sized paper manufactured by Toyo Roshi K. K.

(T5) Adherence to each type of target recording material, and quick-drying properties: Printing is conducted on each of the above-described target recording materials in (T4) for five seconds, following which the printed area is touched with a finger to determine shearing of the image and the absence or presence of smearing. The results are that in all cases, there is no shearing or smearing, indicating superior adherence.

(T6) Printing quality on each type of target recording material: The printing quality of images and characters recorded on the above-described target recording materials in (T4) is confirmed, the results being that feathering and bleeding are both favorable.

(T7) Low odor: 100 g of the ink is measured into a 100 ml glass beaker and the odor thereof is confirmed, the result being that there is substantially no odor.

EXAMPLE 2

Ink is made using the below-described liquid composition through the same method as in Example 1, and the tests T1 through T7 are conducted similar to Example 1. In all cases, superior results are exhibited, similar to Example 1.

Liquid composition:

| | |
|---|---|
| acid blue 9 | 2% |
| (acid blue AE-SF made by Hoechst) | |
| diethylene glycol | 30% |
| triethylene glycol monobutyl ether | 12% |
| pure water | 56% |

EXAMPLES 3 and 4

Ink is made using the below-described liquid compositions through the same method as in Example 1, and the tests T1 through T7 are conducted similar to Example 1. Of these, superior results are exhibited in all of tests T1 through T6, similar to Example 1. In addition, in T7, there is an odor of substantially negligible degree.

EXAMPLE 3

| | |
|---|---|
| acid red 52 | 1% |
| (acid rhodamine B-SF made by Hoechst) | |
| tripropylene glycol | 45% |
| dipropylene glycol monomethyl ether | 5% |
| pure water | 49% |

EXAMPLE 4

| | |
|---|---|
| direct black 168 | 3% |
| (direct black HEF-SF made by Hoechst) | |
| glycerin | 25% |

-continued

| | |
|---|---|
| tripropylene glycol monomethyl ether | 7% |
| pure water | 65% |

EXAMPLE 5

The pigment carbon black and 100 times as much pure water by weight are stirred for 1 hour, and this mixture is then filtered three times and dried. The liquid composition below is then made using this mixture, a dispersion process is conducted by Pull Mill (product name; manufactured by Ashizawa K. K.) to obtain a dispersed liquid. As powdered media to fill the mill, zirconia is used. In addition, the dispersion apparatus includes a ceramic member which comes into contact with the liquid.

Liquid composition:

| | |
|---|---|
| carbon black | 10% |
| (MA-7 made by Mitsubishi Chemical Corp.) | |
| styrene-anhydrous maleic acid copolymer | 7% |
| (weight average molecular weight 10,000; acid value 175) | |
| glycerin | 25% |
| tripropylene glycol monobutyl ether | 5% |
| pure water | 53% |

Next, this dispersed liquid is then placed in a centrifugal separator to extract the coarse, large particles, following which this dispersed liquid is filtered under pressure in a membrane filter with an average hole diameter of 1 μm. The tests T1 through T7 are then conducted on this ink similar to Example 1, and superior results are exhibited, similar to those of Example 1.

Comparative Example 1

Ink is made using the liquid composition shown below through a method similar to Example 1. The tests T1 through T7 are then conducted on this ink the same as in Example 1, the results being that favorable results are obtained in T1 through T6, but in T7, a piercing odor is detected.

Liquid composition:

| | |
|---|---|
| acid yellow 23 | 1% |
| (acid yellow XX-SF made by Hoechst) | |
| polyethylene glycol | 10% |
| (weight average molecular weight 200) | |
| ethylene glycol monomethyl ether | 6% |
| (vapor pressure of 6.2 mm Hg at 20° C.) | |
| pure water | 83% |

Comparative Example 2

Ink is made using the liquid composition shown below through a method similar to Example 1. The tests T1 through T7 are then conducted on this ink the same as in Example 1, the results being that favorable results are obtained in T1 through T4 and T7, but in T5, the permeation of the ink is slow, so that the image smeared when touched by a finger, and in addition, in T6, feathering is favorable, but severe bleeding is observed.

Liquid composition:

| | |
|---|---|
| acid blue 9 | 2% |
| (acid blue AE-SF made by Hoechst) | |
| diethylene glycol | 30% |
| triethylene glycol monomethyl ether | 1% |
| pure water | 67% |

Comparative Example 3

Ink is made using the liquid composition shown below through a method similar to Example 1. The tests T1 through T7 are then conducted on this ink, the results being that favorable results are obtained in T4 through T7, but in T1, alterations in the properties of the liquid and in coloration appeared. In addition, in T2, discharge is not stable at room temperature, 5° C. or 40° C., resulting in poor quality in the recorded material. In addition, in T3, blinding and jet bends are frequently created at the orifice tip in both discharge at two second intervals and discharge after two months of standing.

Liquid composition:

| | |
|---|---|
| acid yellow 23 | 1% |
| (acid yellow XX-SF made by Hoechst) | |
| polyethylene glycol | 1% |
| (weight average molecular weight 200) | |
| triethylene glycol monomethyl ether | 6% |
| pure water | 92% |

Comparative Example 4

Ink is made using the liquid composition shown below through a method similar to Example 1. The tests T1 through T7 are then conducted on this ink, the results being that favorable results are obtained in T1 through T5 and T7, but in T6, bleeding is favorable but severe feathering is observed. In addition, when the back surface of the recording material is observed, it is seen that the ink reaches as far as the back surface.

Liquid composition:

| | |
|---|---|
| acid yellow 23 | 1% |
| (acid yellow XX-SF made by Hoechst) | |
| polyethylene glycol | 10% |
| (weight average molecular weight 200) | |
| triethylene glycol monomethyl ether | 30% |
| pure water | 92% |

Comparative Example 5

Ink is made using the liquid composition shown below through a method similar to Example 1. Recording is tested using the ink and the two types of recording apparatuses exhibited in Example 1, but the ink could not be discharged and printing is impossible.

Liquid composition:

| | |
|---|---|
| acid yellow 23 | 1% |
| (acid yellow XX-SF made by Hoechst) | |
| glycerin | 70% |
| triethylene glycol monomethyl ether | 6% |
| pure water | 23% |

What is claimed is:

1. A water-based ink, comprising:

at least one coloring agent;

at least one polyvalent alcohol in an amount ranging from 5–50% by weight based on the weight of the ink;

at least one polyvalent alcohol monoalkyl ether in an amount ranging from 5–15% by weight based on the weight of the ink; and water.

2. The water-based ink as claimed in claim 1, wherein said at least one polyvalent alcohol monoalkyl ether has a vapor pressure of less than or equal to 0.1 mm Hg at 20° C.

3. The water-based ink as claimed in claim 2, wherein said at least one polyvalent alcohol monoalkyl ether has a vapor pressure of less than 0.01 mm Hg at 20° C.

4. The water-based ink as claimed in claim 1, wherein said at least one polyvalent alcohol monoalkyl ether is present in an amount ranging from 7–12% by weight based on the weight of the ink.

5. The water-based ink as claimed in claim 1, wherein the at least one polyvalent alcohol monoalkyl ether is selected from the group consisting of diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether and tripropylene glycol monobutyl ether.

6. The water-based ink as claimed in claim 1, wherein the at least one polyvalent alcohol monoalkyl ether is selected from the group consisting of triethylene glycol monoalkyl ether and tripropylene glycol monoalkyl ether.

7. The water-based ink as claimed in claim 6, wherein the at least one polyvalent alcohol monoalkyl ether is selected from the group consisting of triethylene glycol monomethyl ether, triethylene glycol monobutyl ether and tripropylene glycol monobutyl ether.

8. The water-based ink as claimed in claim 1, wherein said at least one polyvalent alcohol is selected from the group consisting of polyethylene glycol, polypropylene glycol, ethylene glycol, propylene glycol, butylene glycol, diethylene glycol, dipropylene glycol, triethylene glycol, tripropylene glycol, 1,2,6-hexane triol, thio diglycol, 1,3-butanediol, 1,5-pentanediol, hexylene glycol and glycerin.

9. The water-based ink as claimed in claim 1, wherein said at least one coloring agent is present in an amount ranging from 0.01–20% by weight based on the weight of the ink.

10. The water-based ink as claimed in claim 1, wherein said at least one coloring agent is a water soluble dye.

11. The water-based ink as claimed in claim 1, wherein said at least one coloring agent is a pigment.

12. The water-based ink as claimed in claim 1, wherein said water is present in an amount ranging from 10–90% by weight based on the weight of the ink.

13. The water-based ink as claimed in claim 1, wherein said water is ion exchanged water or distilled water.

14. An ink jet recording method using water-based ink comprising jetting an ink comprising at least one coloring agent, at least one polyvalent alcohol monoalkyl ether present in an amount ranging from 5–15% by weight based on the weight of the ink, at least one polyvalent alcohol present in an amount ranging from 5–50% by weight based on the weight of the ink and water onto a recording medium.

15. The ink jet recording method as claimed in claim 14, wherein said at least one coloring agent is present in an amount of 0.01–20% by weight and said water is present in an amount of 10–90% by weight.

16. The ink jet recording method as claimed in claim 14, wherein said jetting is achieved by static electricity aspiration, a piezoelectric device, or an ink bubble method.

17. The ink jet recording method as claimed in claim 14, wherein the at least one polyvalent alcohol monoalkyl ether has a vapor pressure at 20° C. of less than or equal to 0.1 mm Hg at 20° C.

18. The ink jet recording method as claimed in claim 14, wherein the at least one polyvalent alcohol monoalkyl ether is selected from the group consisting of triethylene glycol monoalkyl ether and tripropylene glycol monoalkyl ether.

* * * * *